Patented Dec. 8, 1925.

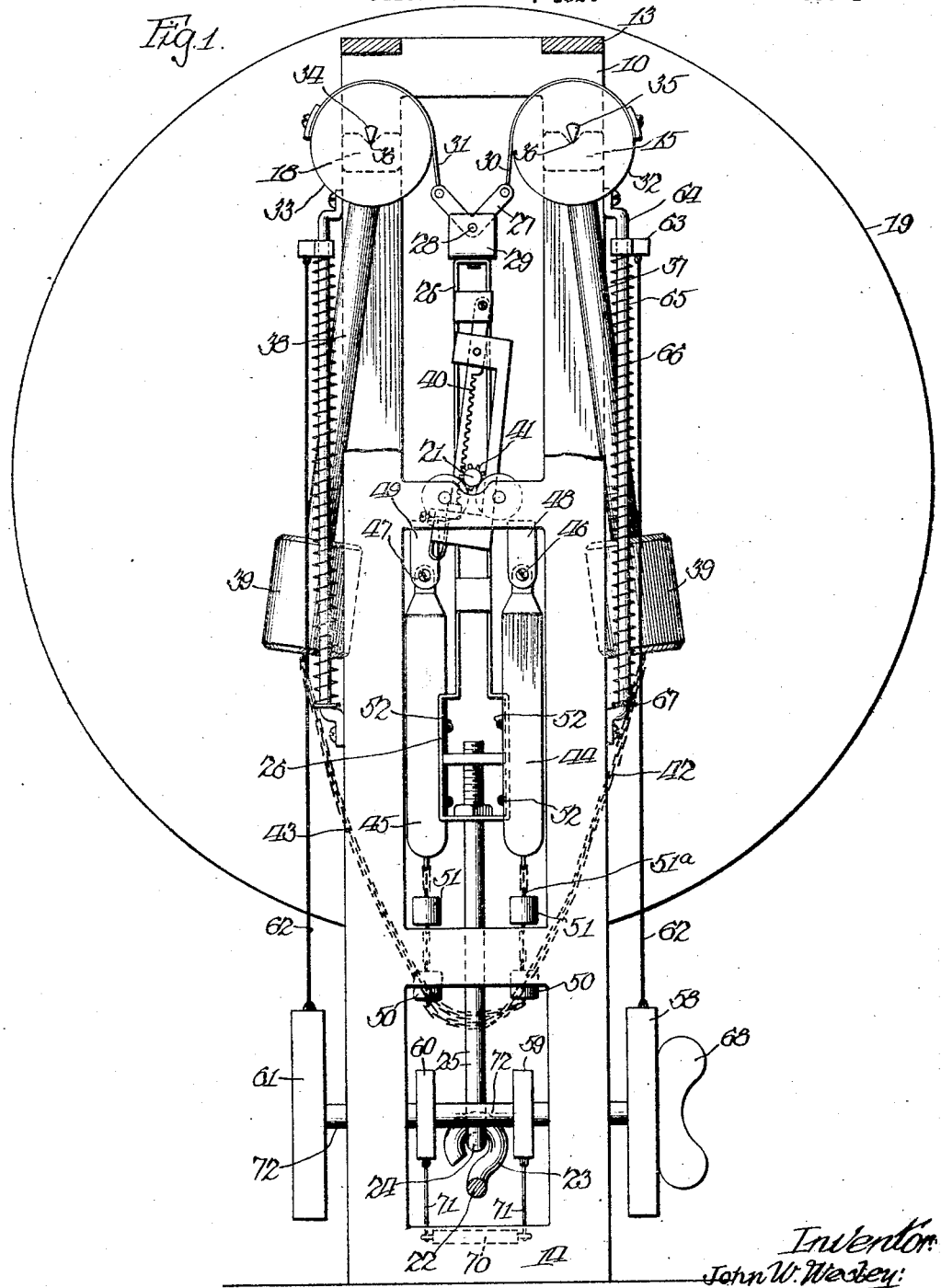

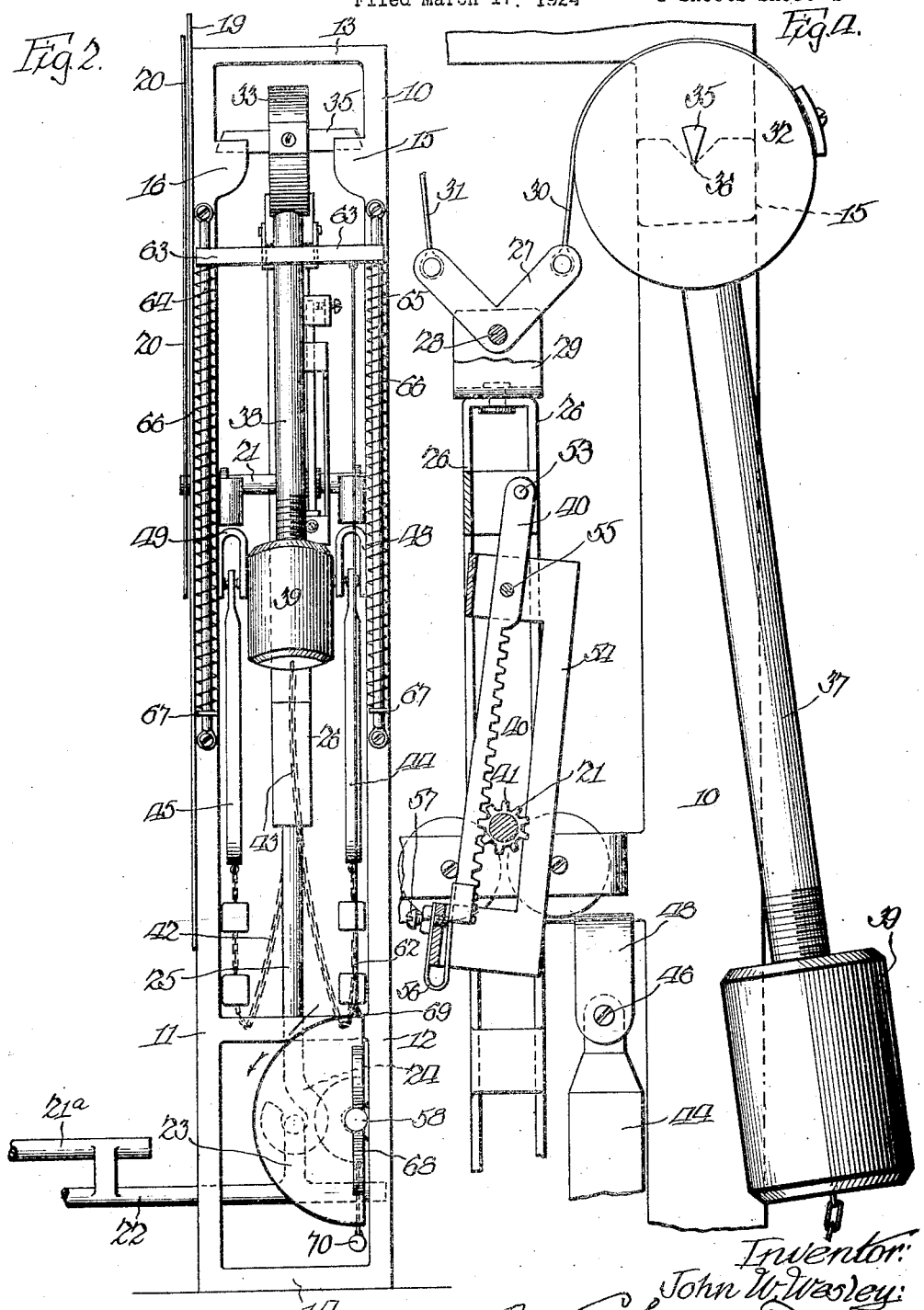

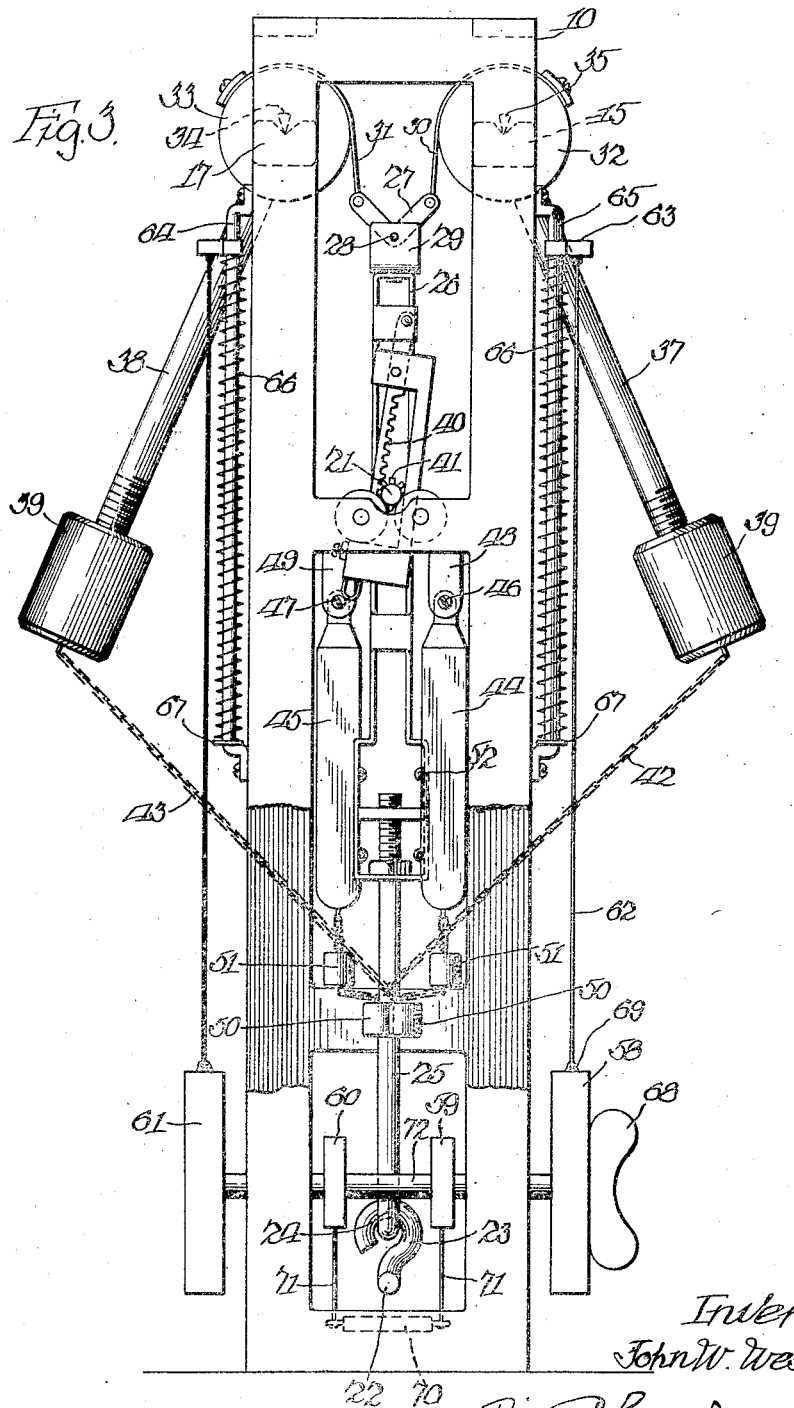

1,564,387

UNITED STATES PATENT OFFICE.

JOHN W. WESLEY, OF CHICAGO, ILLINOIS.

AUTOMATIC WEIGHING MECHANISM.

Application filed March 17, 1924. Serial No. 699,632.

*To all whom it may concern:*

Be it known that I, JOHN W. WESLEY, a citizen of the United States, and a resident of Chicago, in the county of Cook and State of Illinois, have invented certain new and useful Improvements in Automatic Weighing Mechanism, of which the following is a specification.

The invention relates to weighing machines, and particularly to machines of this character which are of the dial type.

The invention has as its principal object the provision of a construction which will accurately measure and define the weight of an object so that the weight indicated upon the dial corresponds with the actual weight of the object being measured.

It is well known that scales or weighing machines of the dial type will to a certain degree indicate the exact weight of the object being measured, but will vary as the weight increases so that the weight indicated upon the dial is not the exact weight of said object.

It is therefore a feature of the invention to provide a construction which will accurately measure and define various weights to the full extent of the indications provided upon said dial without fluctuation in the accuracy thereof as the weight increases.

It is another object of the invention to provide a means auxiliary to the main weighing mechanism which is capable of being successively brought into cooperation with the main weighing mechanism to thereby assist said main weighing mechanism and augment the resistance offered thereby to the weight of the object being measured.

It is a further object to provide an arrangement capable of minute adjustment and which is simple in construction and not liable to variation and inaccuracy due to wear and use.

It is an additional object to provide a structure which may be adjusted for accuracy should the object upon which the scale is placed be slightly inclined or out of alignment, the latter occasionally causing the improper operation of the machine.

It is another object to provide a construction associated with the indicator for insuring the proper position of the indicator should the device be placed upon a support such as that just described.

It is a further feature of the invention to combine means capable of accomplishing the above enumerated and other objects with a mechanism which includes weights for measuring the weight of an object.

In addition it is an object to provide an arrangement whereby said weights and other elements of the structure such as the platform are locked against movement while being shipped or transported from one place to another.

The invention has these and other objects all of which will be more readily understood when read in conjunction with the accompanying drawings, it being obvious however that changes and modifications may be resorted to without departing from the spirit of the appended claims forming a part hereof.

In the drawings,—

Fig. 1 is a rear elevation of a mechanism for accomplishing the invention.

Fig. 2 is a side view of the structure shown in Fig. 1.

Fig. 3 is a view similar to Fig. 1 showing some of the elements in changed positions, and Fig. 4 is an enlarged detail view partially in section of a portion of the structures shown in Figs. 1, 2 and 3.

In the particular embodiment of the invention as illustrated in the drawings, the use of a main frame 10 is contemplated. This frame is composed of the uprights 11 and 12 which are joined together at their opposite ends by the respective connecting elements 13 and 14. The portions 11 and 12 are each provided with the inwardly projecting elements 15, 16, 17 and 18, which provide supports for certain shafts hereinafter to be explained. A dial 19 is secured to the frame 10 and an indicator 20 is mounted upon the indicator shaft 21 which is arranged centrally with respect to the dial. This indicator is designed to be actuated by a weight being applied to the platform 21ª of the scale, which platform is connected to the bar 22 having the hook-shaped portion 23 which in turn engages the hook-shaped portion 24 of a rod 25. This rod 25 is connected with a movable frame generally designated 26 which extends upwardly towards the upper end of the frame 10 and has connected to its uppermost end a member 27, the latter being pivoted at 28 and connected through the medium of the U-shaped portion 29 to the upper end of the frame 26.

This member 27 may be termed an equalizer and has one end of the ribbons 30 and 31 respectively secured thereto. These ribbons have their opposite ends respectively attached to the periphery of the drums 32 and 33 and said drums are journaled in the inwardly projecting elements such as 15, 16, 17 and 18, one of the drums being interposed between one of the pairs of elements such as 15 and 16. The shafts 34 and 35 of these drums are provided with a knife edge such as 36 which is arranged in recesses provided in the elements 15, 16, 17 and 18. The drums 32 and 33 are respectively provided with an arm 37 and 38 having weights 39 provided at their opposite or free extremity. The frame 26 carries a rack and frame generally designated 40, the rack being in engagement with the pinion 41 provided upon the indicator shaft 21.

From the foregoing explanation of the structure thus far explained, it is evident that when the platform bar 22 is moved downwardly, this movement will be transmitted to the rack such as 40 through the medium of the frame 26 to which the rack and frame is connected, and will cause the indicator 20 to be actuated to indicate the weight applied to the platform 21ª and bar 22. It is also evident that when the action just described takes place that, by virtue of the connection between the frame 26 and the drums 32 and 33, the weights 39 respectively provided upon opposite ends of the arms 37 and 38, will be caused to move outwardly with relation to the frame and may assume a position such as illustrated in Fig. 3. It has been found that when a weight is applied to the platform in excess of approximately half of the weight indicated upon the dial such as 19, any weight beyond this point on the dial will be inaccurately measured. To overcome this inaccuracy, a means is provided which cooperates with the weighted arms 37 and 38 and their associated mechanism, which means includes the flexible elements 42 and 43 which extend from the ends of the arms 37 and 38 and are respectively connected to the weighted elements 44 and 55 which are respectively pivotally connected at 46 and 47 to the U-shaped supports 48 and 49, it being understood that the ends of the elements 44 and 45 are arranged in the space provided by these U-shaped supports 48 and 49 as clearly shown in Fig. 2.

From an inspection of Fig. 2, it is evident that the weighted elements 44 and 45 are arranged upon opposite sides of the frame 26, and are in spaced relation thereto so that no interference will occur between them during their movement. The flexible elements 42 and 43 may, when found desirable or necessary, be provided with one or more relatively small weights 50 or 51, from which it can be seen that the weights such as 39 are provided with auxiliary means which may be successively brought into operation to increase the weight resisting qualities of the weighted elements or arms 37 and 38 and will thereby produce a mechanism which will accurately measure the weight of an object to the full extent of the indications provided upon the dial.

The weighted elements 44 and 45 are each provided with one or more means such as the eyelets 52 to allow the end of the flexible elements 42 and 43 to be attached at its points relative to the weighted elements 44 and 45, which will permit of adjustments to further assist in gaining the desired accuracy of the scale or weighing machine.

A means is provided for the purpose of maintaining the indicator 20 in its proper position when indicating zero, which indicator might be thrown out of plumb should the scale be placed upon a surface which is not absolutely horizontal. This means, most clearly shown in Fig. 4, includes the rack 40 which is pivoted at 53 to the frame 26 and has the element 54 pivotally connected thereto at 55. This element 54 is U-shaped in cross-section and surrounds the indicator shaft 21 and the pinion 41 and has the flat spring 56 secured thereto, one end of which engages the free end of the rack 40 and is adapted to be adjusted through the medium of the adjusting screw 57 one end of which bears against that end of the spring 56 which engages the free end of the rack 40, from which it can be seen that, should the scale be tilted to one side or the other out of the vertical, the frame 54 will be moved and by virtue of the connection between the rack and the pinion, this movement of the frame 54 will be transmitted to the rack and pinion and will therefore cause the indicator 20 to be moved and assume its proper zero position. The member 54 being pivoted at 55 to the rack 40 and below the pivot 53 of the rack, and depending from the pivot 55 and also being of more or less weight, will act to at all times maintain the rack in associated relation with the pinion, regardless of the position that the frame 26 may be caused to assume, due to the inclination of the main frame, the U-shaped leaf spring 56 will assist in maintaining the rack in cooperative relation to the pinion 41 even though the scale is jarred or otherwise moved.

A means is provided for locking the arms 37 and 38 the platform 21ª and bar 22 against outward movement relative to the frame 10 when transported from one place to another. This means includes the rotatable segmental elements 58, 59, 60 and 61 clearly shown in Fig. 1. The structure for releasably locking the arms 37 and 38 and their associated mechanism against outward movement with relation to the frame corresponding in construction and operation with the other, an explanation of one will suffice for an understanding of both. For the accomplishment of this object, a wire or other flexible element 62 has one end thereof connected to the periphery of an element such as 58 and extends upwardly and is connected to a member 63 which is slidably mounted upon the rods 64 and 65 which are in turn mounted upon the main frame 10.

The cross member 63 extends from one of the rods 64 and 65 to the other and is maintained in its uppermost position by means of coil springs 66 which are arranged upon the rods and react between the movable cross member 63 and an abutment collar 67. This will maintain the cross member 63 in an upper position and permit the weighted arms 37 and 38 to function without interference. When the segmental parts 58 and 61 are rotated in a contra-clockwise direction somewhat beyond 180 degrees by means of the finger piece 68, the connection 69 between the flexible member 62 and the segmental part such as 58, will be brought to a point to the right of the center of the segmental part 58 as viewed from Fig. 2, which will maintain the bar 63 in a locked and lowered position, which will prevent the weighted arms 37 and 38 from moving outwardly. The mechanism for engaging the platform bar 22 is similar to that just described and includes the segments 59 and 60, the member 70 which is connected to the elements 59 and 60 through the medium of the cords 71—71, the structure being designed to permit the bar 70 to engage the under side of the platform bar 22 and prevent the depression of the platform of the scale. These elements 58, 59, 60 and 61 are all mounted upon the shaft 72 and therefore an operation of the finger piece 68 will cause the locking mechanism for the weighted elements and the platform bar to be actuated simultaneously.

From the foregoing description it is manifest that an arrangement is provided whereby as the weighted arms 37 and 38 are moved outwardly and by weight applied to the platform of the scale, the auxiliary weights such as 50, 51 and 44 45 are brought into consecutive operation, which will increase the weight resisting qualities of the weighted arms 37 and 38 and thereby insure a more accurate measurement of the article to be weighed. It is further evident that a means is provided for permitting an adjustment to insure the positioning of the indicator 20 to its zero position regardless of the inclination at which the scale is supported. It is also evident that a means is provided for locking the weighted arms 37 and 38 and the platform of the scale against movement during the period of transportation or movement of the scale from one point or one location to another.

It will be understood that the weights 50 and 51 may be of different weights and that as each of the same is provided at its upper end with a hook 51ª, they can be readily attached to or detached from the flexible connections 42 or 43, thus enabling the adjustment effected by the use of the said auxiliary weights to be minute and accurate.

By employing the frame 26, rack 40 pivoted thereto, and the frame 54 pivoted to said rack and arranged and operating as above set forth, it is manifest that the rack will be constantly held in engagement with the pinion 41 and that in the event of sudden jars such as occurs by carelessly placing articles on the platform 21ª, displacement of the rack with respect to the pinion will be prevented as the frame 54 strides the pinion and is so positioned that it will strike the shaft 21 before the teeth of the rack can be thrown out of mesh with those of the pinion. It is further obvious that by this arrangement a uniform tension or co-operation of the rack 40 with the pinion will be attained.

Having thus fully described my invention, what I claim as new and desire to secure by Letters Patent is:

1. In a weighing machine, the combination of a platform, an indicator, means for actuating the indicator when an object is arranged upon the platform, and means for controlling the actuation of the first mentioned means and indicator, and means co-operating with said controlling means which is operable after said controlling means reaches a certain position, said cooperating means including a plurality of weights of different weights which are successively brought into operation upon the action of the second mentioned means to control the actuation of said indicator.

2. In a weighing machine, the combination of a platform, an indicator, means for actuating the indicator when an object is arranged upon the platform, and means including a pivoted weight which is operable to a predetermined position and weights which are brought into operation after said pivoted weight reaches said predetermined position, said weights being successively caused to cooperate with the pivoted weight to control the actuation of the indicator.

3. In a weighing machine, the combination of a platform, an indicator, means for actuating the indicator when an object is arranged upon the platform, and means for controlling the actuation of the first mentioned means including a pivoted weight and weights of different weights which are successively caused to cooperate with the pivoted weight to control the actuation of the indicator, said pivoted weights being operable to a predetermined position independently of said second mentioned weights.

4. In a weighing machine, the combination of a platform, an indicator, means for actuating the indicator when an object is arranged upon the platform, and means for controlling the actuation of the first mentioned means including a pivoted weight for measuring the weight of objects of a certain weight and weights which are connected to the pivoted weight and are successively caused to cooperate with the pivoted weight to control the actuation of the indicator, to measure the weight of objects beyond said above mentioned weight.

5. In a weighing machine, the combination of a platform, an indicator, means for actuating the indicator when an object is arranged upon the platform, and means for controlling the actuation of the first mentioned means and indicator, said means for controlling the actuation of the first mentioned means including a plurality of weights which are connected with each other and which are successively brought into operation to control the actuation of said indicator after said indicator has been moved to indicate a certain weight.

6. In a weighing machine, the combination of a platform, an indicator, means for actuating the indicator when an object is arranged upon the platform, and means for controlling the actuation of the first mentioned means and indicator, said means for controlling the actuation of the first mentioned means including a plurality of weights which are connected with each other by a flexible element and which are successively brought into operation to control the actuation of said indicator, after the indicator has been moved a predetermined distance.

7. In a weighing machine, the combination of an indicator, a platform, means for actuating the indicator when an object is arranged upon the platform, and means for controlling the actuation of the first mentioned means and the indicator, said means for controlling the actuation of the first mentioned means including pivoted weighted elements of a certain weight and means auxiliary to said pivoted weighted elements for increasing the action of said pivoted weighted elements as the weight of the object being measured increases, said weighted elements being movable to a certain position independently of said auxiliary means.

8. In a weighing machine, the combination of an indicator, a platform, means for actuating the indicator when an object is arranged upon the platform, and means for controlling the actuation of the first mentioned means and the indicator, said means for controlling the actuation of the first mentioned means including pivoted weighted elements of a certain weight and means auxiliary to said pivoted weighted elements for successively increasing the action of said pivoted elements as the weight of the object being measured increases, said pivoted weighted elements being movable to a certain position independently of said auxiliary means.

9. In a weighing machine, the combination of an indicator, a platform, means for actuating the indicator when an object is arranged upon the platform, and means for controlling the actuation of the first mentioned means and the indicator, said means for controlling the actuation of the first mentioned means including pivoted weighted elements and means auxiliary to said pivoted weighted elements for increasing the action of said pivoted weighted elements as the weight of the object being measured increases, a flexible element secured to the pivoted weighted elements, said auxiliary means being secured to said flexible element.

10. In a weighing machine, the combination of an indicator, a platform, means for actuating the indicator when an object is arranged upon the platform, and means for controlling the actuation of the first mentioned means and the indicator, said means for controlling the actuation of the first mentioned means including pivoted elements and means auxiliary to said pivoted elements for successively increasing the action of said pivoted elements as the weight of the object being measured increases, a flexible element secured to the pivoted element, said auxiliary means being secured to said flexible element, and including a pivoted element which is connected to the flexible element.

11. In a weighing machine, the combination of a platform with a pivoted indicator and means for actuating the indicator when an object is arranged upon the platform, said means including means for maintaining the indicator at a zero position when the main frame is inclined from the vertical, said means including a pivoted rack and a pivoted member carried by said rack.

12. In a weighing machine, the combination of a platform with a pivoted indicator and means for actuating the indicator when an object is arranged upon the platform, said means including means for maintaining the indicator at a zero position when the main frame is inclined from the vertical, said means including a pivoted rack and another member carried by said rack, said rack and member being movable with respect to each other.

13. In a weighing machine, the combination of a platform with a pivoted indicator and means for actuating the indicator when an object is arranged upon the platform, said means including means for maintaining the indicator at a zero position when the main frame is inclined from the vertical, said means including a pivoted rack and another member carried by said rack, said rack and member being movable with respect to each other, and a yieldable connection between said rack and member.

JOHN W. WESLEY.